United States Patent
Gao et al.

(10) Patent No.: US 9,071,131 B2
(45) Date of Patent: Jun. 30, 2015

(54) CONVERSION SYSTEM FOR MULTI DIRECT CURRENT VOLTAGE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Zhi-Yong Gao, Wuhan (CN); Ting-Ting Wu, Wuhan (CN); Yu-Lin Liu, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 165 days.

(21) Appl. No.: 13/785,080

(22) Filed: Mar. 5, 2013

(65) Prior Publication Data

US 2013/0314955 A1    Nov. 28, 2013

(30) Foreign Application Priority Data

May 24, 2012    (CN) .......................... 2012 1 0163701

(51) Int. Cl.

| H02M 1/14 | (2006.01) |
|---|---|
| H02M 7/12 | (2006.01) |
| H02M 7/06 | (2006.01) |
| H02M 1/00 | (2007.01) |

(52) U.S. Cl.
CPC *H02M 7/12* (2013.01); *H02M 7/06* (2013.01); *H02M 2001/0025* (2013.01); *H02M 2001/009* (2013.01)

(58) Field of Classification Search
CPC ........................................................ H02M 7/12
USPC ........ 363/21.01, 21.02, 21.06, 19, 45, 81, 84, 363/89, 125, 126, 65; 323/255, 258, 253, 323/254, 297, 298, 353, 354; 315/104, 105, 315/106, 309, 115
See application file for complete search history.

(56) References Cited

U.S. PATENT DOCUMENTS

| 3,344,307 | A | * | 9/1967 | Van Anrooy et al. ............. 315/8 |
| 3,479,487 | A | * | 11/1969 | Stoll ............................. 219/494 |
| 2002/0105099 | A1 | * | 8/2002 | Warren ........................... 261/26 |
| 2006/0039171 | A1 | * | 2/2006 | Lavieville et al. .............. 363/19 |

FOREIGN PATENT DOCUMENTS

| CN | 2113513 U | 8/1992 |
| CN | 2131248 Y | 4/1993 |

* cited by examiner

*Primary Examiner* — Gary L Laxton
*Assistant Examiner* — Trinh Dang
(74) *Attorney, Agent, or Firm* — Novak Druce Connolly Bove + Quigg LLP

(57) ABSTRACT

A conversion system includes a transformer, a rectifier element, a filter circuit, a voltage regulator circuit, and a divider circuit. The voltage regulator circuit includes a first option switch, a first regulator, and a second regulator. The transformer outputs an AC voltage, and the rectifier element converts the AC voltage to a pulsating DC voltage. The filter circuit converts the pulsating DC voltage to a ripple DC voltage. The divider circuit outputs a first DC voltage of a constant positive value when the first option switch connects to the first regulator, and the divider circuit connects to the first regulator to control value of the first DC voltage value. The divider circuit outputs a second DC voltage of a constant negative value when the first option switch connects the second regulator, and the divider circuit is connected to the second regulator to control value of the second DC voltage.

19 Claims, 2 Drawing Sheets

CONVERSION SYSTEM FOR MULTI DIRECT CURRENT VOLTAGE

BACKGROUND

1. Technical Field

The present disclosure relates to conversion systems, and particularly to a conversion system for multi-direct current (DC) voltage.

2. Description of Related Art

Modern electronic systems may require a negative DC voltage and a positive DC voltage. However, conventional power conversion systems can only supply signal DC voltages in one direction, i.e., either a negative voltage or a positive voltage. Therefore, the conventional power conversion system may not satisfy the requirements of modern electronic systems.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
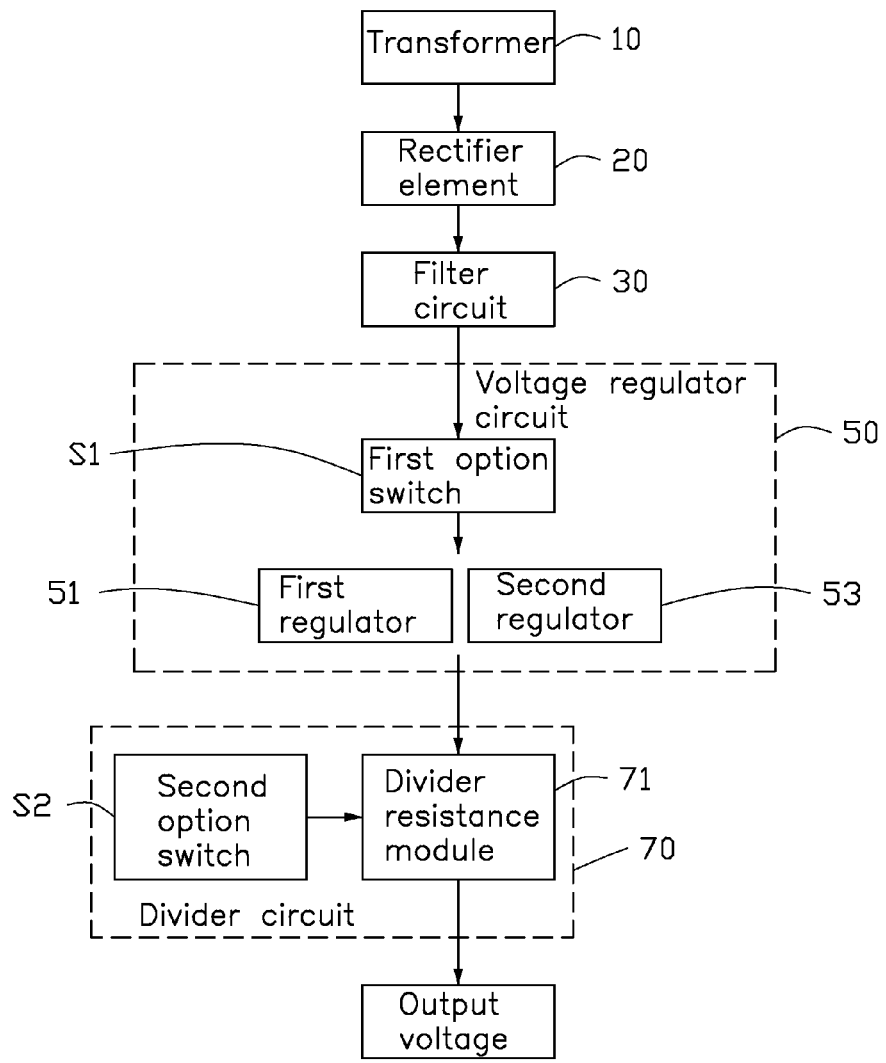
FIG. 1 is a block diagram of an embodiment of a conversion system.

FIG. 1 illustrates a conversion system in one embodiment configured to generate a multiplicity of direct current (DC) voltages. The conversion system includes a transformer 10, a rectifier element 20, a filter circuit 30, a voltage regulator circuit 50, and a divider circuit 70.

Figure 2:
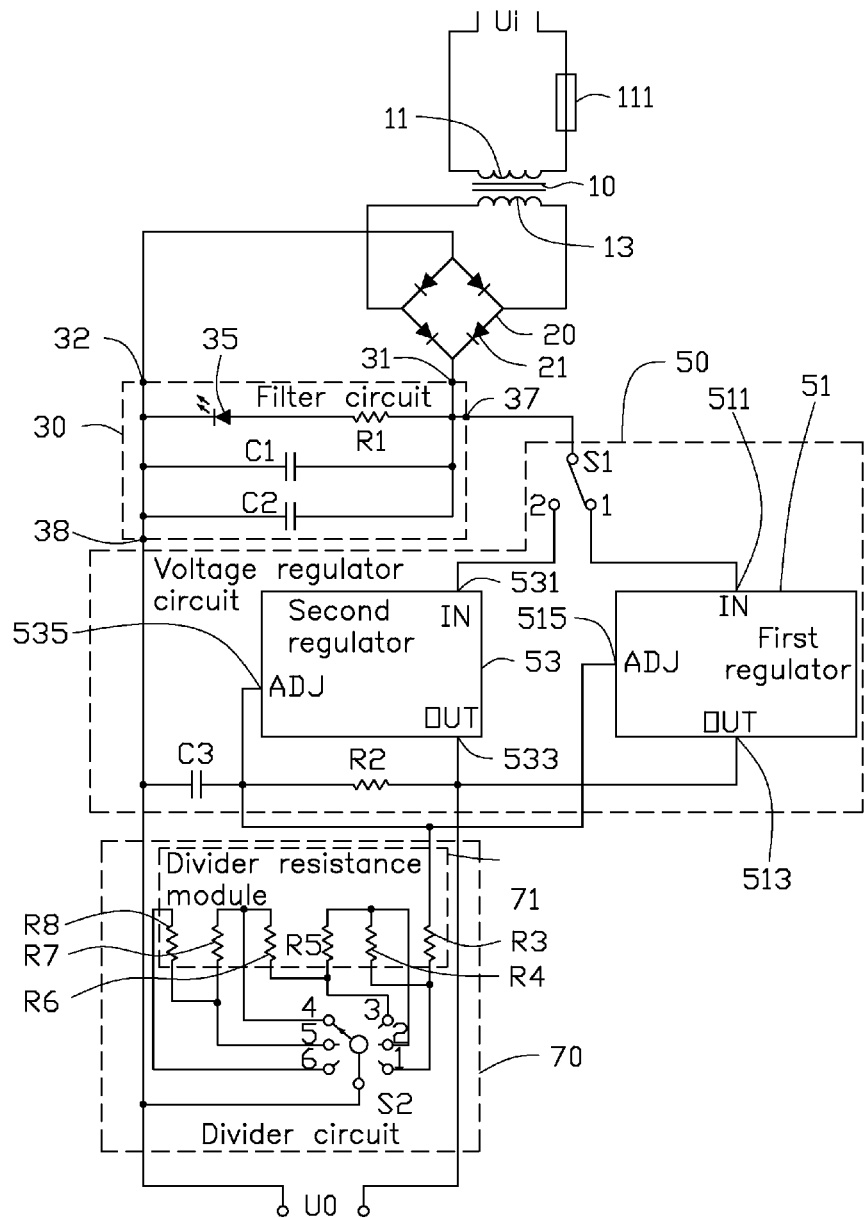
FIG. 2 is a circuit diagram of the conversion system of FIG. 1.

Referring to FIG. 2, the transformer 10 includes a primary coil 11 and a secondary coil 13 to receive an alternating current (AC) voltage UI. The primary coil 11 and the secondary coil 13 can change the AC voltage supplied to an AC voltage U1 with a lower frequency. Two output ends of the transformer 10 output the AC voltage U1 to the rectifier element 20. One end of the primary coil 11 is electrically connected to a fuse 111 for protecting the conversion system.

The rectifier circuit 20 includes four rectifier diodes 21. The four rectifier diodes 21 form a bridge rectifier circuit to convert the AC voltage U1 to a pulsating DC voltage U2. The rectifier circuit 20 outputs the pulsating DC voltage U2 to the filter circuit 30 via a first output end 31 and a second output end 32. The second output end 32 is grounded.

The filter circuit 30 includes a first resistance R1, a luminous diode 35, a first capacity C1 and a second capacity C2. The first resistance R1 is electrically connected to the luminous diode 35 in series, and the luminous diode 35 indicates whether the conversion system is working normally or not. A first end of the first resistance R1 is electrically connected to the first output end 31, and a second end of the first resistance R1 is electrically connected to an anode of the luminous diode 35. A cathode of the luminous diode 35 is grounded. The first capacity C1 is electrically connected to the second capacity C2 in parallel and electrically connected to the first resistance R1 and the luminous diode 35 in parallel. An anode of the first capacity C1 is electrically connected to the first output end 31, and a cathode of the first capacity C1 is grounded. An anode of the second capacity C2 is electrically connected to the first output end 31, and a cathode of the second capacity C2 is grounded. The first capacity C1 can filter low-frequencies from the pulsating DC voltage U2, and the second capacity C2 can filter high-frequencies from the pulsating DC voltage U2. The filter circuit 20 converts the pulsating DC voltage U2 to a ripple DC voltage U3 and outputs the ripple DC voltage U3 to the voltage regulator circuit 50 via the third output end 37 and the fourth output end 38. The fourth output end 38 is grounded.

The voltage regulator circuit 50 includes a first option switch S1, a first regulator 51, and a second regulator 53, a second resistance R2, and a third capacity C3. In one embodiment, the first regulator 51 is LM317T and able to output positive voltage, and the second regulator 53 is LM337T and able to output negative voltage. The first option switch S1 includes a first fixed end and two option ends. The first fixed end of the first option switch S1 is electrically connected to the third output end 37. One option end of the first option switch S1 is electrically connected to an input end 511 of the first regulator 51 and the other option end is connected to an input end 531 of the second regulator 53. A first end of the second resistance R2 is electrically connected to an output end 513 of the first regulator 51 and an output end 533 of the second regulator 53. The first end of the second resistance R2 is connected to an output end U0. A second end of the second resistance R2 is electrically connected to a common end 515 of the first regulator 51 and a common end 535 of the second regulator 53. An anode of the third capacity C3 is electrically connected to the common end 515 of the first regulator 51 and the common end 535 of the second regulator 53. A cathode of the third capacity C3 is grounded. The voltage regulator circuit 50 converts the ripple DC voltage U3 to a constant DC voltage U4.

The divider circuit 70 includes a divider resistance module 71 and a second option switch S2. The divider resistance module 71 includes a plurality of divider resistances. The second option switch S2 includes a second fixed end and a plurality of option ends corresponding to the plurality of divider resistances. The second fixed end is grounded. In one embodiment, there are six divider resistances R3~R8, and there are six option ends; the six option ends provide 3V, 4.5V, 6V, 7.5V, 9V, and 12V.

A first end of the third divider resistance R3 is connected to the anode of the third capacity C3, and a second end of the third divider resistance R3 is electrically connected to a first end of the fourth divider resistance R4 and a first option end of the second option switch S2. The second end of the fourth divider resistance R4 is electrically connected to a first end of the fifth resistance R5 and the second option end of the second option switch S2. The second end of the fifth divider resistance R5 is electrically connected to a first end of the sixth divider resistance R6 and the third option end of the second option switch S2. A second end of the sixth divider resistance R6 is electrically connected to a first end of the seventh divider resistance R7 and the fourth option end of the second option switch S2. A second end of the seventh divider resistance R7 is electrically connected to a first end of the eighth divider resistance R8 and the fifth option end of the second option switch S2. The second end of the eighth divider resistance R8 is electrically connected to the sixth option end of the second option switch S2.

When the conversion system needs to output a first DC voltage of a constant positive value, the first option switch S1 is connected to the first regulator 51. The transformer 10 outputs the AC voltage U1 to the rectifier element 20. The rectifier element 20 coverts the AC voltage U1 to the pulsating DC voltage U2 and outputs the pulsating DC voltage U2. The filter circuit 30 coverts the pulsating DC voltage U2 and outputs the ripple DC voltage U3. The first regulator 51 converts the ripple DC voltage U3 to a constant positive DC voltage. The second fixed end of the second option switch S2 is connected to any one of the plurality of option ends of the second option switch S2 to control value of the first DC voltage.

When the conversion system needs to output a second DC voltage of a constant negative, the first option switch S1 is connected to the first regulator 51. The transformer 10 outputs the AC voltage U1 to the rectifier element 20. The rectifier element 20 coverts the AC voltage U1 to the pulsating DC voltage U2 and outputs the pulsating DC voltage U2. The filter circuit 30 converts the pulsating DC voltage U2 and outputs the ripple DC voltage U3. The second regulator 53 converts the ripple DC voltage U3 to a constant negative DC voltage. The second fixed end of the second option switch S2 is connected to any one of the plurality of option ends of the second option switch S2 to control value of the second DC voltage.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A conversion system comprising:
   a transformer;
   a rectifier element;
   a filter circuit;
   a voltage regulator circuit comprising a first option switch, a first regulator, and a second regulator; and
   a divider circuit comprising a divider resistance module and a second option switch, the divider resistance module comprising a plurality of divider resistances;
   wherein the transformer outputs an AC voltage to the rectifier element, the rectifier element converts the AC voltage to a pulsating DC voltage and outputs the pulsating DC voltage to the filter circuit, and the filter circuit converts the pulsating DC voltage to a ripple DC voltage and outputs the ripple DC voltage to the first option switch; when the first option switch is connected to the first regulator, the first regulator converts the ripple DC voltage to a constant positive DC voltage, the divider circuit outputs a first DC voltage of a constant positive value, and the second option switch is connected to the plurality of divider resistances to control value of the first DC voltage; when the first option switch is connected to the second regulator, the second regulator converts the ripple DC voltage to a constant negative DC voltage, the divider circuit outputs a second DC voltage of a constant negative value, and the second option switch is connected to the plurality of divider resistances to control value of the second DC voltage.

2. The conversion system of claim 1, wherein the rectifier element comprises four rectifier diodes, and the four rectifier diodes cooperatively convert the AC voltage to the pulsating DC voltage.

3. The conversion system of claim 1, wherein the filter circuit comprises a first resistance and a luminous diode connected to the first resistance in series, a first end of the first resistance is electrically connected to the rectifier element, another end of the first resistance is electronically connected to an anode of the luminous diode, and a cathode of the luminous diode is grounded.

4. The conversion system of claim 1, wherein the voltage regulator circuit further comprises a second resistance and a third capacity, a first end of the second resistance is connected to an output end of the first regulator and an output end of the second regulator, and a second end of the second resistance is connected to a common end of the first regulator, a common end of the second regulator, and an anode of the third capacity; and a cathode of the third capacity is grounded.

5. The conversion system of claim 1, wherein the first option switch comprises a first fixed end and two option ends, the first fixed end is connected to the filter circuit, the two option ends are respectively connected to an input end of the first regulator and an input end of the second regulator.

6. The conversion system of claim 1, wherein the second option switch comprises a second fixed end and a plurality of option ends, the second fixed end is grounded, and each of the plurality of divider resistances is located between adjacent two of the plurality of option ends.

7. The conversion system of claim 3, wherein the filter circuit further comprises a first capacity and a second capacity connected to the first capacity in parallel, the first capacity is configured to filter low-frequency signals of the pulsating DC voltage, and the second capacity is configured to filter high-frequency signals of the pulsating DC voltage.

8. The conversion system of claim 4, wherein the plurality of divider resistances are connected in series and electrically connected to the anode of the third capacity.

9. The conversion system of claim 7, wherein the first capacity is connected to the first resistance and the luminous diode in parallel, and the second capacity is connected to the first resistance and the luminous diode in parallel.

10. A conversion system comprising:
    a transformer;
    a rectifier element;
    a filter circuit;
    a voltage regulator circuit comprising a first option switch, a first regulator, and a second regulator; and
    a divider circuit,
    wherein the transformer outputs of an AC voltage to the rectifier element, the rectifier element converts the AC voltage to a pulsating DC voltage and outputs the pulsating DC voltage to the filter circuit, and the filter circuit converts the pulsating DC voltage to a DC voltage and outputs the DC voltage to the first option switch; the divider circuit outputs a first DC voltage of a constant positive value when the first option switch is connected to the first regulator, the divider circuit is electrically connected to the first regulator to control value of the first DC voltage; the divider circuit outputs a second DC voltage of a constant negative value when the first option switch is connected to the second regulator, the divider circuit is connected to the second regulator to control value of the second DC voltage;
    wherein the voltage regulator circuit further comprises a second resistance and a third capacity, a first end of the second resistance is electrically connected to an output end of the first regulator and an output end of the second regulator, and a second end of the second resistance is electrically connected to a common end of the first regulator, a common end of the second regulator, and an anode of the third capacity; and a cathode of the third capacity is grounded.

11. The conversion system of claim 10, wherein the rectifier element comprises four rectifier diodes, and the four rectifier diodes cooperatively convert the AC voltage to the pulsating DC voltage.

12. The conversion system of claim 10, wherein the filter circuit comprises a first resistance and a luminous diode connected to the first resistance in series, a first end of the first resistance is electrically connected to the rectifier element, another end of the first resistance is electronically connected to an anode of the luminous diode, and a cathode of the luminous diode is grounded.

13. The conversion system of claim 10, wherein the plurality of divider resistances are in series and electrically connected to the anode of the third capacity.

14. The conversion system of claim 10, wherein the first option switch comprises a first fixed end and two option ends, the first fixed end is connected to the filter circuit, the two option ends are connected to an input end of the first regulator and an input end of the second regulator, respectively.

15. The conversion system of claim 10, wherein the divider circuit comprises a second option switch and a divider resistance module, the divider resistance module comprises a plurality of divider resistances, and the second option switch is capable of connecting to the plurality of divider resistances.

16. The conversion system of claim 10, wherein when the first option switch is connected to the first regulator, the first regulator converts the ripple DC voltage to a constant positive DC voltage; and when the first option switch is connected to the second regulator, the second regulator converts the ripple DC voltage to a constant negative DC voltage.

17. The conversion system of claim 12, wherein the filter circuit further comprises a first capacity and a second capacity connected to the first capacity in parallel, the first capacity is configured to filter low-frequency signals of the pulsating DC voltage, and the second capacity is configured to filter high-frequency signals of the pulsating DC voltage.

18. The conversion system of claim 15, wherein the second option switch comprises a second fixed end and a plurality of option ends, the second fixed end is grounded, and one of the plurality resistances is connected in between adjacent two of the plurality of option ends.

19. The conversion system of claim 17, wherein the first capacity is connected to the first resistance and the luminous diode in parallel, and the second capacity is connected to the first resistance and the luminous diode in parallel.

* * * * *